(12) United States Patent
Chenault, III et al.

(10) Patent No.: US 10,449,800 B2
(45) Date of Patent: Oct. 22, 2019

(54) HYBRID COMPOSITE WHEEL

(71) Applicant: Superior Industries International, Inc., Southfield, MI (US)

(72) Inventors: Henry Clay Chenault, III, Fayetteville, AR (US); Parveen Kakar, Novi, MI (US); Miguel Sanchez-Araiza, Fayetteville, AR (US); Henry Lee Renegar, Fayetteville, AR (US)

(73) Assignee: Superior Industries International, Inc., Southfield, MI (US)

( * ) Notice: Subject to any disclaimer, the term of this patent is extended or adjusted under 35 U.S.C. 154(b) by 35 days.

(21) Appl. No.: 15/422,627

(22) Filed: Feb. 2, 2017

(65) Prior Publication Data
US 2017/0217249 A1    Aug. 3, 2017

Related U.S. Application Data

(60) Provisional application No. 62/290,122, filed on Feb. 2, 2016.

(51) Int. Cl.
*B60B 3/10* (2006.01)
*B60B 3/04* (2006.01)
*B60B 5/02* (2006.01)

(52) U.S. Cl.
CPC ............ *B60B 3/10* (2013.01); *B60B 3/041* (2013.01); *B60B 5/02* (2013.01); *B60B 2310/316* (2013.01); *B60B 2360/10* (2013.01); *B60B 2360/341* (2013.01); *B60B 2900/111* (2013.01); *B60B 2900/112* (2013.01); *Y02T 10/86* (2013.01)

(58) Field of Classification Search
CPC ......... B60B 5/00; B60B 5/02; B60B 2360/30; B60B 2360/32; B60B 2360/322; B60B 2360/324; B60B 2360/33; B60B 2360/34

USPC ........... 301/64.702, 64.703, 95.102, 95.103, 301/95.107
See application file for complete search history.

(56) References Cited

U.S. PATENT DOCUMENTS

| 5,549,360 | A | | 8/1996 | Lipeles |
| 5,803,553 | A | * | 9/1998 | Wei ...................... B23P 11/025 301/63.103 |
| 5,899,538 | A | | 5/1999 | Tatraux-Paro |
| 6,726,292 | B1 | * | 4/2004 | Schroeder ................ B60B 5/02 301/104 |

(Continued)

FOREIGN PATENT DOCUMENTS

DE    102013114343 A1    7/2015

OTHER PUBLICATIONS

International Search Report and Written Opinion for WO Application No. PCT/US2017/016136, dated Jun. 5, 2017.

*Primary Examiner* — S. Joseph Morano
*Assistant Examiner* — Jean W Charleston
(74) *Attorney, Agent, or Firm* — Miller Canfield

(57) ABSTRACT

A road wheel for a vehicle includes a face portion and a rim portion. The face portion is formed from a metallic alloy and defines a central portion plurality of spokes extending between the central portion and a proximal bead element. The rim portion is formed from a composite material and defines an annular wall circumscribing a wheel axis extending to a distal bead element from said face portion. The proximal bead element is defined by the metallic alloy and the distal bead element is defined by the composite. The face portion and the rim portion are interconnected in interlocking engagement.

9 Claims, 4 Drawing Sheets

(56) References Cited

U.S. PATENT DOCUMENTS

| | | |
|---|---|---|
| 2007/0222279 A1 | 9/2007 | Csapo |
| 2011/0018336 A1* | 1/2011 | Mercat ...................... B60B 7/01 |
| | | 301/95.106 |
| 2014/0116593 A1 | 5/2014 | Lucaora |
| 2015/0273934 A1* | 10/2015 | Huidekoper .............. B60B 5/02 |
| | | 301/11.1 |

* cited by examiner

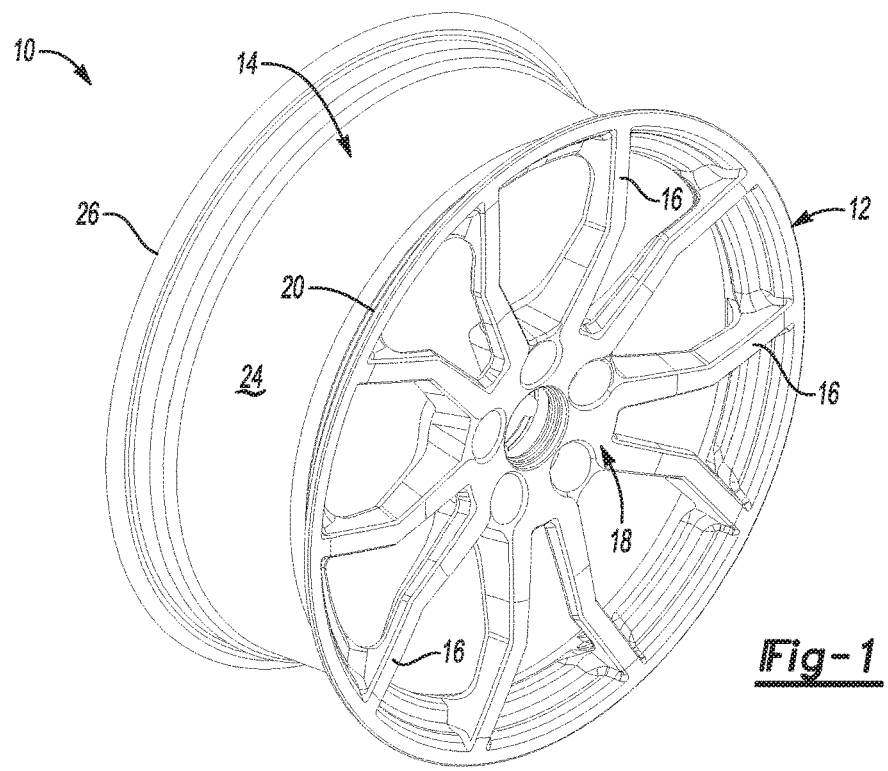
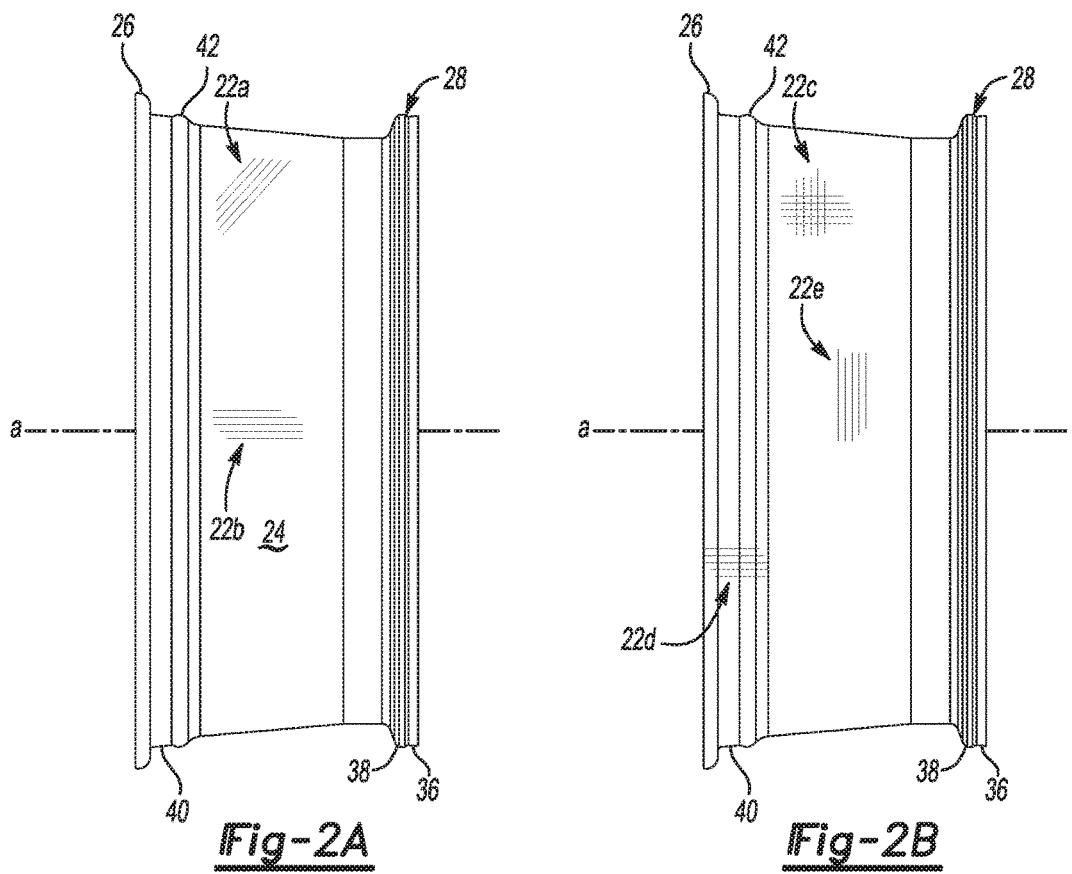

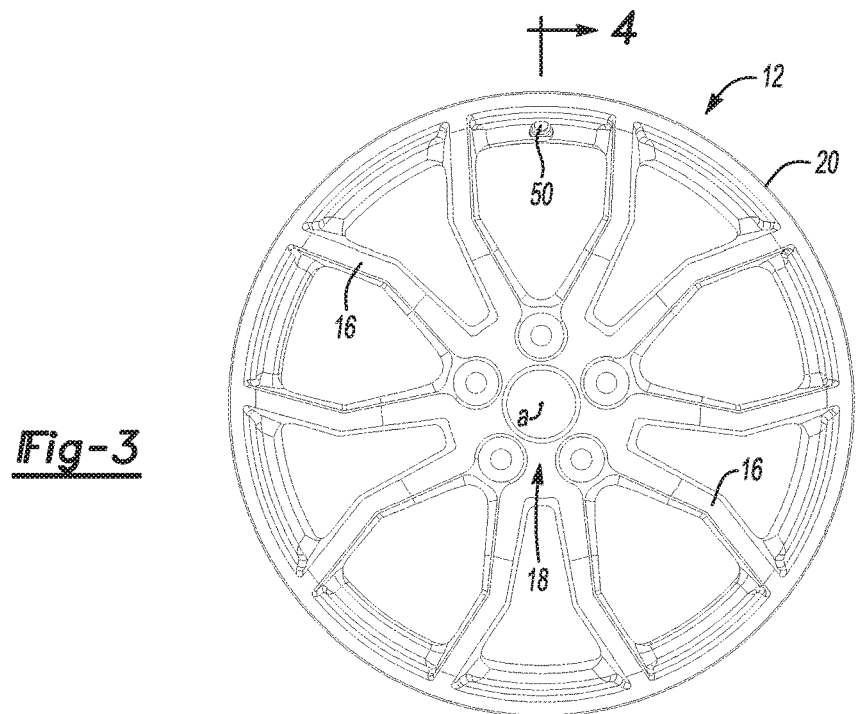
Fig-3
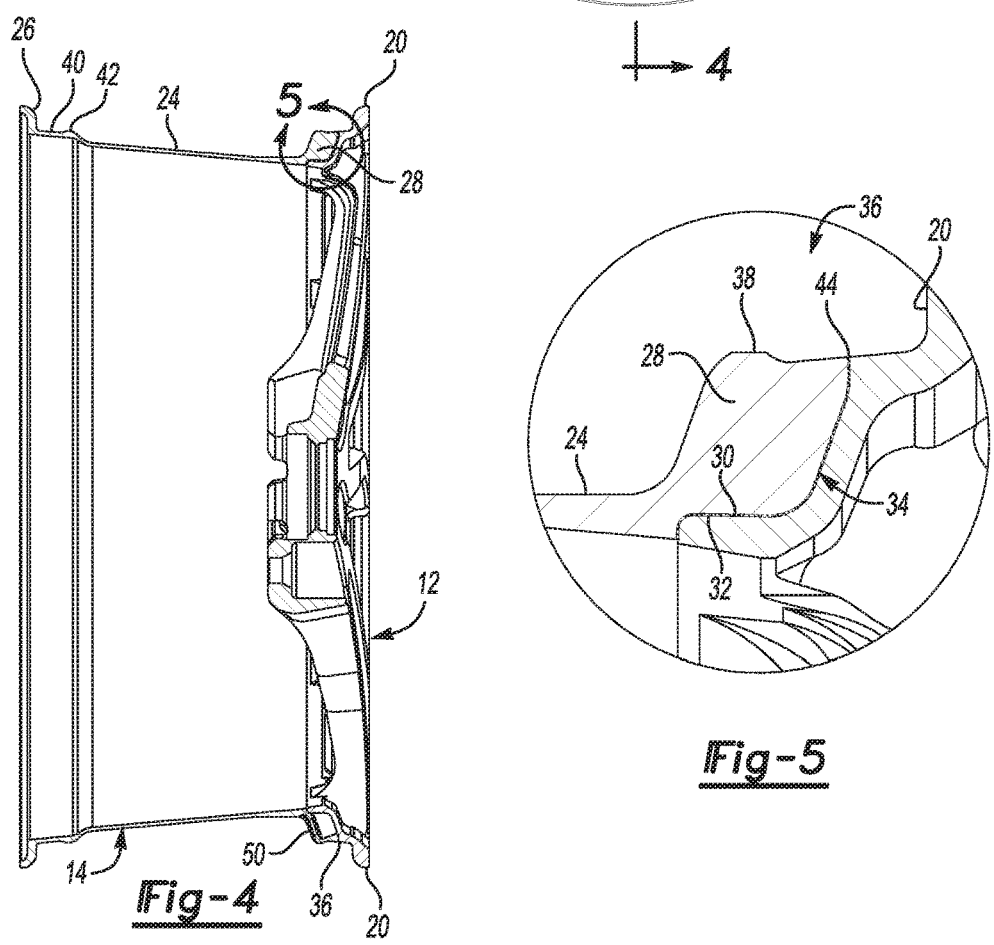
Fig-4
Fig-5

HYBRID COMPOSITE WHEEL

PRIOR APPLICATIONS

This application claims priority to U.S. Provisional Patent Application No. 62/290,122 filed Feb. 2, 2016, the contents of which are included herein by reference.

TECHNICAL FIELD

The present application relates generally toward a light weight vehicle wheel having a composite rim. More specifically, the present invention relates toward a light weight vehicle wheel having a composite rim portion and an alloy face portion.

BACKGROUND

Cast alloy wheels have been in use on automobiles designed for road use and other vehicles designed for off-road for many years. Cast alloys such as, for example, aluminum, magnesium and titanium have provided desirable appearance while also providing reduced mass over older steel wheels that include hubcaps for providing desirable appearance. Ever increasing fuel efficiency standards have put pressure on vehicle manufacturers to continuously reduce mass, even on vehicle components already providing low mass features, such as, for example, alloy wheels. It is believed that reducing mass of a wheel is more beneficial than reducing mass of other vehicle components because the energy required to rotate a wheel with a disadvantageous moment of inertia.

Some efforts have been made to reduce the mass of a vehicle wheel by forming all or part of the wheel from composite materials. Forming an entire wheel from a composite has proven too expensive for mass production given the complexity of forming spokes and lug portions of the wheel. Other efforts have been made to form the face of a wheel from an alloy and the rim of the wheel from a composite material. Joining the alloy to the composite has not proven viable for a commercial application because fastener and complex joining features have been employed, none of which are viable.

Therefore, it would be desirable to develop a wheel that makes use of light weight alloys in combination with the best features of composite materials that is technically and economically viable for commercial use.

SUMMARY

A road wheel for a vehicle includes a face portion and a rim portion. The face portion is formed from a metallic alloy and defines a central portion plurality of spokes extending between the central portion and a proximal bead element. The rim portion is formed from a composite material and defines an annular wall circumscribing a wheel axis extending to a distal bead element from said face portion. The proximal bead element is defined by the metallic alloy and the distal bead element is defined by the composite. The face portion and the rim portion are interconnected in interlocking engagement.

The road wheel of the present invention provides the desirable aspects of an alloy with those of a composite in a simplified manner making providing a commercially feasible embodiment. The interlocking engagement between the face portion and the rim portion eliminates the need for providing tertiary mechanical fasteners causing imbalance in the wheel and additional assembly complexity. In one embodiment, the wheel of the present invention includes a face portion that defines a face mating wall and a rim portion that defines a rim mating wall with the face mating wall including a mechanical interlock being radially outwardly from a portion of said rim mating wall. In this non-limiting embodiment, one of the face portion and the rim portion are subject to thermal treatment causing the dimensions of the rim mating wall and the face mating wall to change allowing the face portion and the rim portion to be mated. Upon return to ambient temperature, a mechanical interlock is achieved securing the face portion to the rim portion.

BRIEF DESCRIPTION OF THE DRAWINGS

Other advantages of the present invention will be readily appreciated as the same becomes better understood by reference to the following detailed description when considered in connection with the accompanied drawings, wherein:

FIG. 1 shows a perspective view of the hybrid composite wheel of the present invention;

FIGS. 2A and 2B show alternative reinforcing fiber orientations of the composite rim portion;

FIG. 3 shows a plan view of the hybrid composite wheel of the present invention;

FIG. 4 shows a side sectional view of the hybrid composite wheel through lines 4-4 of FIG. 3;

FIG. 5 shows an expanded view of area 5 of FIG. 4;

DETAILED DESCRIPTION

Figure 6:
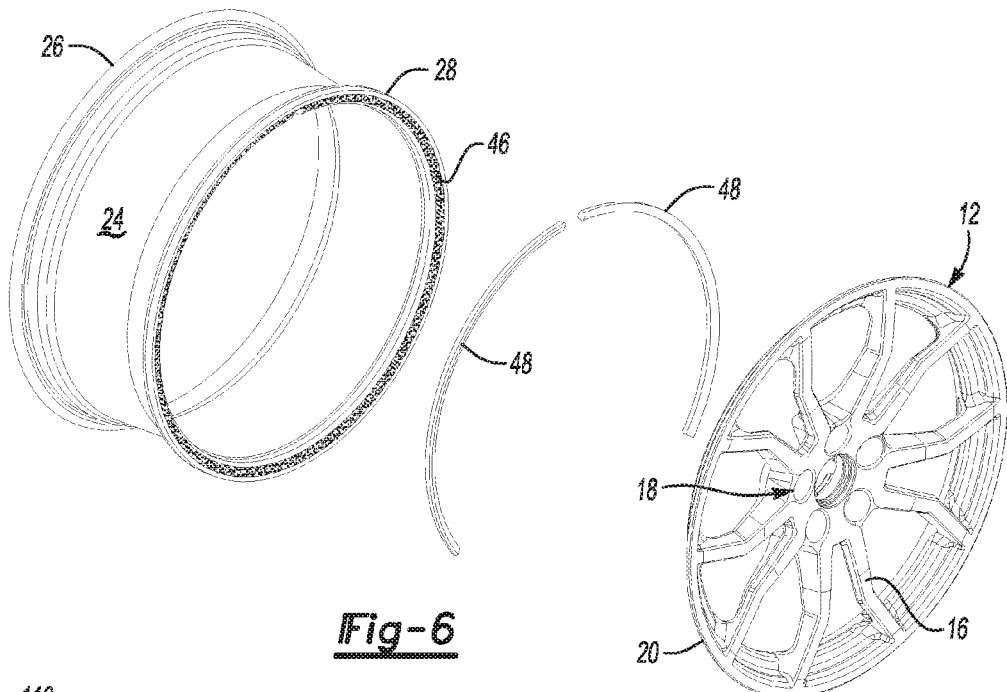
FIG. 6 shows an exploded view of an alternative embodiment of the present invention having different density preforms.

Referring to FIG. 1, the hybrid wheel of the present invention is generally shown at 10. The wheel 10 includes a face portion 12 and a rim portion 14. In one embodiment, the face portion 12 is formed from a metallic alloy. The face portion can be formed via many different methods e.g., the alloy is molten and injected into a die cavity of a die (not shown) to define the cast face portion, or the alloy is formed via a hot forging operation. Where necessary, the face portion 12 is machined or milled to a desired geometric configuration to achieve desired appearance and performance characteristics.

The face portion 12 includes a plurality of spokes 16 that extend between a central portion 18 and a proximal bead element 20. The proximal bead element 20 circumscribes a wheel axis a and interconnects each of the plurality of spokes 16. It should be understood that the face portion 12 can be cast from a variety of different alloys, which include, but are not limited to an aluminum alloy, a magnesium alloy, a titanium alloy, and the like. Although conventional spokes 16 are contemplated to be within the scope of this invention, an alternative enhanced embodiment is included as defined in co-pending U.S. patent application Ser. No. 14/805,999, the contents of which are incorporated herein by reference.

The rim portion 14 is formed from a composite polymer reinforced by fibers 22 as will be explained further herein below. In one embodiment, polyphenylene sulfide (PPS) is a carrier resin used to form the rim portion 14. In alternative embodiments, the polymer carrier resin includes urethane, TPP, or other equivalent polymer carriers capable of providing performance requirements desirable of the rim portion 14 of the wheel 10. However, it has been determined that the unique qualities of thermoplastic materials provide enhanced manufacturing efficiencies not available from thermoset materials. For example, thermoplastic is re-formable during the manufacturing serial manufacturing steps as will be explained further below. In addition, thermoplastic materials, and therefore, the wheel 10 of the present invention may be recycled at the end of it useful life.

As best shown in FIGS. 2A and 2B, the composite binder is infused with fibers 22 to improve stiffness and strength of the rim portion 14. The fibers 22 include a plurality of different orientations providing localized strength where desired. In addition, the fibers 22 include glass fiber, carbon fiber, nylon fiber, carbon nanofiber such as graphene and the like and even combinations of thereof. In this embodiment, the fibers are included in a resinous tape made of a thermoplastic material. The fibers are elongated and oriented lengthwise to the tape. As shown at 22a of FIG. 2A, the tape, along with the fibers 22 are oriented upon the annular wall 24 that extends between the proximal bead 20 and a distal bead 26 at an angle to the wheel axis a. Alternatively, the tape, along with the fibers 22 are oriented parallel to the axis a as represented at 22b of FIG. 2A. FIG. 2B shows still further fiber 22 orientations where the fibers are interwoven generating a crosswise orientation as represented in 22c. In this embodiment, as with the other embodiments, multiple layers of tape are applied to the mandrel in crisscross fashion so that the fibers 22 overlap at angles. Alternatively, the fibers 22 are interwoven with in the tape so that multiple layers of tape create a near random overlap of the fibers 22. It should also be understood that the tape and the fibers 22 are also located distal bead 26 as shown in 22d, providing stiffening properties to the distal bead 26 the purpose of which will become more evident herein below. Still further, as shown at 22e the fibers in the annular wall 24 are perpendicular to the axis A to circumscribe the axis A.

As set forth above, the tape includes a thermoplastic carrier resin. Therefore, when a layer of the tape is heated above the melting point of the thermoplastic, the tape takes the form of the mandrel and adheres to adjacent layers of tape orienting the fibers 22 as desired. Because the carrier resin is a thermoplastic, the tape can be reformed during later process steps as will be described further below.

It should be understood to those of ordinary skill in the art that multiple configurations or orientations of the fibers 22 provide localized stiffening only where necessary. Limited use of the fibers 22 only where required reduces both cost and mass of the rim portion 14. As explained above, the fibers 22 are contained in the tape or strip (not shown) including the thermoplastic carrier resin and laid over a mandrel or onto a die surface. When laid over a mandrel, a preform is 48, or multiple preforms can be generated and later enclosed in a die cavity wherein the preform is pressed into net or near net shape. Because the carrier resin is a thermoplastic, the preforms are reheated in the die cavity to about the melting temperature of the thermoplastic while being pressed into net or near net shape. Adjacent preforms 48 become bonded together when heated to the melting point of the thermoplastic. Once formed in the die cavity, the rim portion 14 is cut, machined, and even milled to final design configuration, when necessary.

As is best represented in FIGS. 4 and 5, which show sectional views through line 4-4 of FIG. 3, the rim portion 14 defines a mating bead 28 having a cross-sectional area that is greater than the cross-sectional area of the annular wall 24. The mating bead 28 of the rim portion 14 defines a rim mating wall 30 that abuts a face mating wall 32 of the face portion 12. The face mating wall 32 includes a draft angle terminating at a location that is disposed radially outwardly from at least a portion of the rim mating wall 30 such that the face mating wall 32 and the rim mating wall 30 define a mechanical interlock preventing the rim portion 14 from being separated from the face portion 12 once assembled. However, to further secure the rim portion 14 to the face portion 12, an adhesive 34 is disposed between the face mating wall 32 and the rim mating wall 30.

The draft angle of the face mating wall is contemplated to be about 1.5 degrees, or about the angle preventing the assembly or separation of the face portion 12 from the rim portion 14. To facilitate assembly of the rim portion 14 to the face portion 12 one of the rim portion 14 and the face portion 12 is subject to thermal treatment to change the dimensions of either of the rim portion 14 or the face portion 12 allowing assembly. By way of non-limiting example, once formed, the rim portion 14 is maintained at an ambient temperature while the face portion 12, after having been formed, is frozen to a subzero (0° C.) temperature causing the alloy to contract allowing the face portion 12 to be mated to the rim portion 14. When the face portion 12 returns to ambient temperature, or the same temperature as the rim portion 14, the face portion 12 expands causing the mechanical interlock between the rim mating wall 30 and the face mating wall 32 preventing the face portion 12 from being separated from the rim portion 14. It is further contemplated that the PPS formulation is selected to provide a similar or nearly identical thermal rate of expansion as that of the alloy forming the face portion 12 so that the mechanical interlock between the face mating wall 32 and the rim mating wall 30 does not change when the wheel 10 is subject to extreme environmental conditions.

As set forth above, a plurality of different fibers 22 may be used on a single composite composition. Therefore, fibers such as, for example, nylon are contemplated for use in the mating bead 28 of the rim portion 14. Locating nylon fibers at the mating bead 28 positions a nylon fiber proximate the face mating wall 32 to prevent or reduce potential for corrosion of the alloy defining the face portion 12. It should be understood that any fiber or filler known to reduce or inhibit corrosion of the selected alloy can be locally provided to the mating bead 28 or any other mating surface of the rim portion 14 to the face portion 12 while other types of fibers may be used to achieve different mechanical properties at different locations of the rim portion 14.

It should be understood that the fibers may be independently processed, randomized, coated, treated, or the like, including a combination of these orientations and processing methods. In addition, multiple layers of fibers having the same or cross-wise orientation may also be used. The fibers may be disposed in fabrics, cloths, weaves, screen, tapes, and even yarns, which might be particularly useful in the mating bead or other area requiring additional or specialized reinforcement. It should also be understood that the fibers may also take the form of nanofibers at a random orientation to provide different and beneficial enhancement to the rim portion 14.

The proximal bead 20 defines a proximal tire seat 36 with a proximal protuberance 38. A distal bead 26 defines a distal tire seat 40 with a distal protuberance 42. The proximal tire seat 36 is bifurcated by a seam 44 defined between the face portion 12 and the rim portion 14. Therefore, in this embodiment, the proximal bead element 20 is formed from the cast alloy defining the face portion and the distal bead element 26 is defined by the composite material forming the rim portion 14. Further, the distal tire seat 40 is formed entirely from the composite material defining the rim portion 14 and the proximal tire seat 36 is formed partially from the composite material forming the end portion 14 and the cast alloy forming the face portion 12.

Referring now to FIG. 6, an exploded view of a further embodiment of the wheel 10 is shown. It is contemplated by the inventors that further mass reductions may be achieved by reducing composite density in various areas of the rim portion 14. For example, thicker cross-sections of the rim portion 14 include a lower density than center sections of the rim portion 14 such as the annular wall 24. By way of non-limiting example, the mating bead 28 includes a low density section 46 that is adjustable by selection of different fiber materials encapsulated in the resin defining the mating bead 28.

Alternatively, a single or a plurality of preforms 48 having a lower density than the PPS is inserted into the dye cavity prior to molding the rim portion 14. Further, additional elements of the rim portion 14 such as, for example, the annular wall 24 and the distal bead element 26 may also be defined by inserting preforms 48 into the dye cavity prior to molding the rim portion 14.

In a further embodiment, higher density sections of the rim portion 14 may also be utilized to balance the wheel 10. For example, the preform 48 can include a higher density and mass than the PPS or other carrier resin and be located opposite a valve stem aperture 50. In this manner, the rim portion 14 including a localized high mass to function as a counterbalance the mass of a valve stem (not shown) and tire pressure sensor (not shown) received by the valve stem aperture 50 eliminating a need for additional mass being added to the wheel 10 specifically for counterbalancing the valve stem.

Alternative embodiments to the present invention are shown in FIGS. 7A through 7E where partial cross-sectional views of the wheel are generally shown. A first alternative embodiment is shown at 110 in FIG. 7A, a rim portion 114 is formed from the thermoplastic composite described above. In this embodiment, the rim portion defines an annular wall 124, that extends circumscribes the wheel axis a (FIG. 2A, 2B) between a distal bead 26 and a mating bead 28. In this embodiment, a proximal bead 120 is formed from the composite material and is part of the rim portion 114. A proximal tire seat 136 is also formed from the composite material. A face portion 112 is formed from an alloy and is adhered to a mating surface 152 of the rim portion 114 disposed on an underside of the proximal bead 120 with an adhesive.

The face portion 112 defines a mating wall 154 onto which the mating surface 152 of the rim portion 114 is adhered. A preform 148 is disposed between the mating surface 152 of the rim portion 114 and the mating wall 154 of the face portion 112 locally providing a different density or performance characteristics from the balance of the rim portion 112 composite material. It should be understood that the preform 148 of the first alternative embodiment is assembled in a similar manner, and provides similar properties as is disclosed in the prior embodiment set forth above.

It should be apparent to one of ordinary skill in the art that the first alternate embodiment wheel 110 also includes distal tire seat 140 that is formed from the thermoplastic composite so that the tire does not contact the alloy, but only the composite. As such, the tire is received by the fully composite proximal tire seat 136 and the fully composite distal tire seat 140.

Figure 7A:
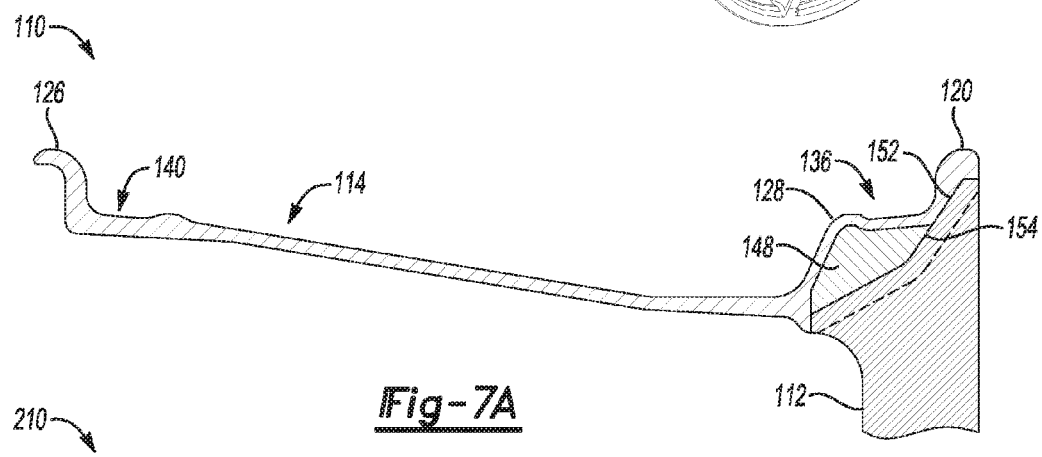
FIGS. 7A through 7E show cross-sectional views of further alternative embodiments of the present invention.
Figure 7B:
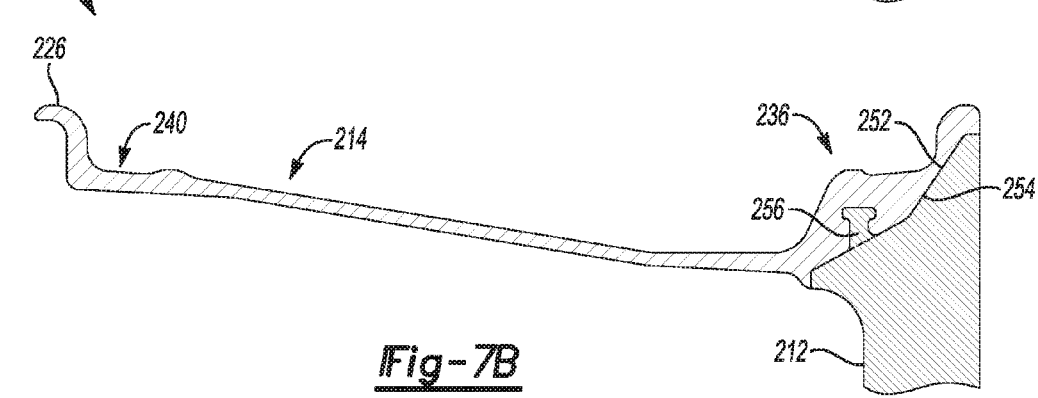

A second alternative embodiment of the wheel of the present invention is shown at 210 of FIG. 7B where like elements to those in the first embodiment have like element numbers in the 200 series Like elements to the first embodiment will not be explained again relative to the second embodiment. In the second alternative embodiment, the rim portion 214 defines a mating bead 228 that receives a fastening stud 256 to secure the face portion 212 to the rim portion 214. It should be understood that a plurality of studs 256 are disposed upon mating wall 254 of the face portion 212. Alternatively, the stud 256 is a continuous rib disposed on the mating wall 254 that circumscribes the wheel axis a. The tape described above is laid over the stud 256 and forms to the stud 256 upon being heated. In one non-limiting example, the face portion 212 is releasably affixed to the mandrel allowing the tape, when heated, to form around the stud 256. Alternatively, or in addition to the above, the face portion 212 is placed into the die cavity and the tape forms securely around the stud 256 when the tape is heated by the die. It should be further understood that adhesive may be included to secure the mating wall 254 of the face portion 212 to the mating surface 252 of the rim portion 214.

Figure 7C:
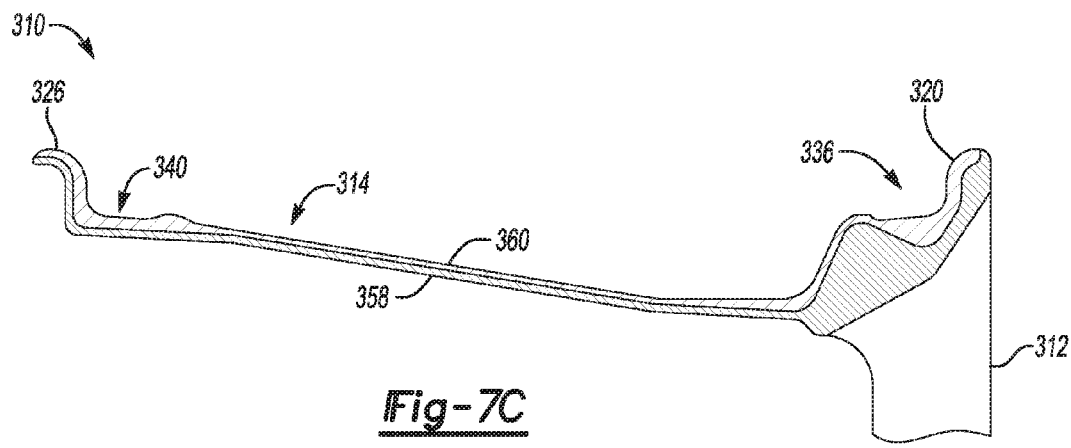

A third alternative embodiment of the wheel of the present invention is shown at 310 of FIG. 7C where like elements to those in the first embodiment have like element numbers in the 300 series Like elements to the first embodiment will not be explained again relative to the third embodiment. In this embodiment, the rim portion 314 includes an alloy rim base 358 that is contiguous with the alloy face portion 312. The alloy rim base 358 functions as a mandrel so that the composite tape is laid over the rim base 358 generating a composite face 360 extending from a proximal bead 320 to a distal bead 326.

Subsequent to applying the composite face 360 to the rim base 358, the wheel 310 is placed in a die to form the thermoplastic composite to a predetermined configuration. While the rim base, at least at the annular wall 324 includes a substantially constant thickness, the die reshapes the thermoplastic composite to form the feature required to proper seat a tire. For example, the die reshapes the proximal bead 320 to form a proximal tire seat 336. Likewise, the die reshapes the distal bead 326 to form a distal tire seat 140. As above, fiber orientation 22 (FIGS. 2A-2B) are oriented as desired and adhesive is optionally applied, either locally or generally, between the rim base 358 and the composite face 360. However, given the interlocking formation of the composite face 360 with the rim base 358 it is not believed that adhesive will be necessary to secure the composite face 360 to the rim base 358. It should be further understood that the this embodiment includes the tire mating only to the composite face 360 and not to the alloy rim base 358.

Figure 7D:
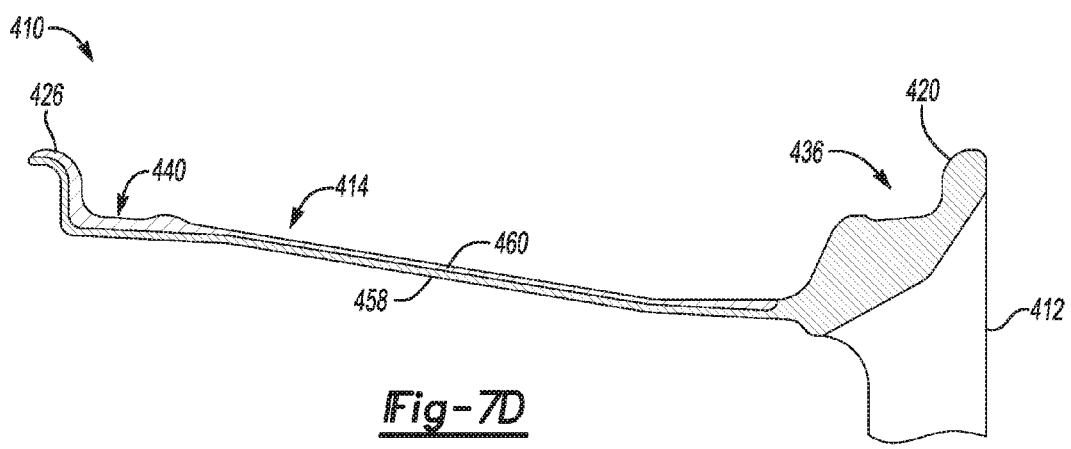

A fourth alternative embodiment of the wheel of the present invention is shown at 410 of FIG. 7D where like elements to those in the first embodiment have like element numbers in the 400 series Like elements to the first embodiment will not be explained again relative to the fourth embodiment. In this embodiment, a composite face 460 is applied to an alloy rim base 458 in a manner described above. In this embodiment, the alloy rim base 458 of the rim portion 414 is contiguous with the alloy face portion 412. However, the proximal bead 420 and the proximal tire seat 436 are defined by the cast alloy and not the composite face 460. Therefore, the composite face 460 extends over the annular wall 414 to the distal bead 426 to and defines the distal tire seat 440. As set forth above, the alloy rim base 458 functions as a mandrel so that the composite tape is laid over the rim base 458 generating the composite face 460 that is formed into the desired configuration by reheating the thermoplastic composite carrier in the die.

Figure 7E:
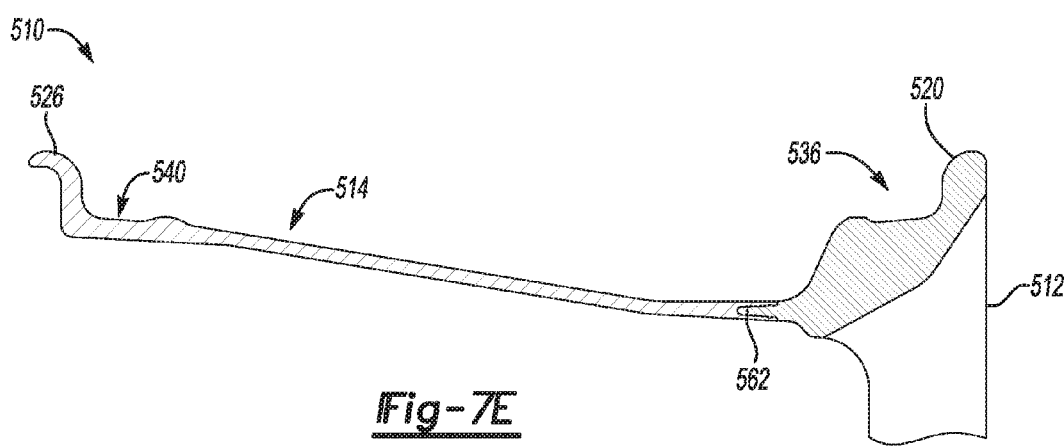

A fifth alternative embodiment of the wheel of the present invention is shown at 510 of FIG. 7E where like elements to those in the first embodiment have like element numbers in the 500 series Like elements to the first embodiment will not be explained again relative to the fifth embodiment. In this embodiment, the rim portion 514 is formed entirely of the composite material by laying the fiber containing tape over a mandrel set forth above. The rim portion 514 receives an engagement rib 562 that extends in an axial direction while circumscribing the axis a of the wheel 510. As in the fourth embodiment, the proximal bead 520 and the proximal tire seat 536 are defined by the cast alloy and not the composite material. An adhesive secures the composite rim portion 514 to the alloy engagement rib 562.

In addition, the distal bead 526 and the distal tire seat 540 are formed entirely of the thermoplastic composite material as is explained in the first and second alternative embodiments. Therefore, the tape is laid over a mandrel and the thermoplastic composite is reshaped in a heated die to form the distal bead 526 and the distal tire seat 540

Obviously, many modifications and variations of the present invention are possible in light of the above teachings foregoing invention has been described in accordance with the relevant legal standards; thus, the description is merely exemplary rather than limiting in nature. Variations and modifications to the disclosed embodiment may become apparent to those skilled in the art and do come within the scope of the invention. Accordingly, the scope of the legal protection afforded this invention can only be determined by studying the following claims.

What is claimed is:

1. A road wheel for a vehicle, comprising:
   a face portion and a rim portion;
   said face portion being formed from a metallic alloy and defining a plurality of spokes extending between a central portion and a proximal bead;
   said rim portion being formed from a composite material defining an annular wall circumscribing a wheel axis and defining a proximal tire seat and a distal tire seat with said annular wall disposed therebetween; and
   said proximal tire seat being received by a mating wall defined by said metallic alloy of said face portion and said proximal tire seat defining a continuous sealable surface between said proximal bead and a mating bead, with said mating bead defining a cross-section being greater than a cross-section of said annular wall.

2. The road wheel set forth in claim 1, wherein said mating bead defines a lower density than said annular wall thereby reducing mass of said rim portion at said mating bead.

3. The road wheel set forth in claim 1, wherein said face portion defines a face mating wall and said rim portion defines a rim mating wall with said face mating wall including a mechanical interlock disposed radially outwardly from a portion of said rim mating wall.

4. The road wheel set forth in claim 3, wherein said face mating wall is bonded to said rim mating wall with an adhesive.

5. The road wheel set forth in claim 1, wherein said composite material defining said rim portion comprises a thermoplastic polymer including fibers for strengthening said rim portion.

6. The road wheel set forth in claim 5, wherein said fibers include a plurality of different orientations throughout said rim portion thereby providing localized strength to said rim portion.

7. The road wheel set forth in claim 5, wherein said face portion defines a face mating wall and said rim portion defines a rim mating wall with said fibers disposed in said mating wall comprise nylon thereby inhibiting corrosion of said metal alloy defining said face portion.

8. The road wheel set forth in claim 1, wherein said composite material includes a first density and a second density being greater than said first density and said second density is included at a location opposite a valve stem aperture.

9. The road wheel set forth in claim 1, wherein said proximal bead element defines a tire seat and said tire seat is bifurcated by a seam formed between said metallic alloy and said composite material.

* * * * *